(12) United States Patent
Lee (10) Patent No.: US 12,431,548 B2
(45) Date of Patent: Sep. 30, 2025

(54) SIDE PENETRATION TEST APPARATUS FOR BATTERY CELLS AND BATTERY CELL PENETRATION TEST METHOD USING THE SAME

(71) Applicant: LG ENERGY SOLUTION, LTD., Seoul (KR)

(72) Inventor: Tae Gyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/280,555

(22) PCT Filed: Nov. 9, 2022

(86) PCT No.: PCT/KR2022/017546
§ 371 (c)(1),
(2) Date: Sep. 6, 2023

(87) PCT Pub. No.: WO2023/085768
PCT Pub. Date: May 19, 2023

(65) Prior Publication Data
US 2024/0154190 A1 May 9, 2024

(30) Foreign Application Priority Data
Nov. 10, 2021 (KR) .................. 10-2021-0153612

(51) Int. Cl.
*H01M 10/42* (2006.01)
*B21G 1/08* (2006.01)

(52) U.S. Cl.
CPC .......... *H01M 10/4285* (2013.01); *B21G 1/08* (2013.01)

(58) Field of Classification Search
CPC .................. H01M 10/4285; B21G 1/08
(Continued)

(56) References Cited

U.S. PATENT DOCUMENTS 11,302,953 B2 * 4/2022 Hasegawa ......... H01M 10/4235
2009/0289635 A1 * 11/2009 Coccio .................. G10H 3/186
324/427

(Continued)

FOREIGN PATENT DOCUMENTS

| CN | 201945527 U | 8/2011 |
|----|----|----|
| EP | 3264514 A1 | 1/2018 |

(Continued)

OTHER PUBLICATIONS

Extended European Search Report dated Oct. 2, 2024 issued in European Patent Application No. 22893188.7. (Note: WO2022/174870A2 cited in EESR was cited in prior IDS).

(Continued)

*Primary Examiner* — Huy Q Phan
*Assistant Examiner* — Trung Q Nguyen
(74) *Attorney, Agent, or Firm* — Morgan, Lewis & Bockius LLP (57) ABSTRACT

A penetration test apparatus may include a penetration unit having a needle-shaped conductor formed in the shape of a sharp needle, a guide unit configured to push out the penetration unit such that the needle-shaped conductor bores a side of a battery cell, and a holder configured to receive the penetration unit. When the guide unit pushes the penetration unit, the needle-shaped conductor of the penetration unit can penetrate the side of the battery cell. A battery cell penetration test method using the penetration test apparatus is also disclosed.

16 Claims, 4 Drawing Sheets

(58) Field of Classification Search
USPC ....... 324/400, 426, 430–437, 500, 600, 501, 324/639, 642, 702, 76.11
See application file for complete search history.

(56) References Cited

U.S. PATENT DOCUMENTS

| | | | |
|---|---|---|---|
| 2015/0145525 A1 | 5/2015 | Seo et al. | |
| 2018/0074131 A1* | 3/2018 | Lim | G01R 31/367 |
| 2019/0190030 A1* | 6/2019 | Chu | H01M 50/581 |
| 2021/0218099 A1 | 7/2021 | Rhee et al. | |
| 2022/0163593 A1* | 5/2022 | Kagei | H01M 10/4285 |
| 2023/0402601 A1* | 12/2023 | Yamazaki | H01M 10/052 |
| 2024/0055676 A1* | 2/2024 | Trzaska | H01M 10/486 |

FOREIGN PATENT DOCUMENTS

| | | |
|---|---|---|
| JP | 2009-158266 A | 7/2009 |
| JP | 2014-032173 A | 2/2014 |
| JP | 2015-072266 A | 4/2015 |
| JP | 2016-004722 A | 1/2016 |
| JP | 2018-523273 A | 8/2018 |
| JP | 2018-152260 A | 9/2018 |
| JP | 2019-140079 A | 8/2019 |
| KR | 2013-0043478 A | 4/2013 |
| KR | 20-2014-0005759 U | 11/2014 |
| KR | 2015-0054371 A | 5/2015 |
| KR | 10-1549177 B1 | 9/2015 |
| KR | 2016-0028725 A | 3/2016 |
| KR | 10-2017-0030356 A | 3/2017 |
| KR | 2017-0031116 A | 3/2017 |
| KR | 10-1744120 B1 | 6/2017 |
| KR | 10-1764299 B1 | 8/2017 |
| KR | 2021-0090477 A | 7/2021 |
| WO | 2022/174870 A2 | 8/2022 |

OTHER PUBLICATIONS

Office Action dated Sep. 9, 2024 issued in corresponding Japanese Patent Application No. 2023-552559.
International Search Report (with translation) dated Feb. 15, 2023 issued in corresponding International Patent Application No. PCT/KR2022/017546.
Office Action issued in EP application 22893188.7 dated Feb. 13, 2024.
Office Action dated Aug. 18, 2025 issued in corresponding Korean Patent Application No. 10-2021-0153612.

* cited by examiner

SIDE PENETRATION TEST APPARATUS FOR BATTERY CELLS AND BATTERY CELL PENETRATION TEST METHOD USING THE SAME

TECHNICAL FIELD

This application claims the benefit of priority to Korean Patent Application No. 2021-0153612 filed on Nov. 10, 2021, the disclosure of which is incorporated herein by reference in its entirety.

The present invention relates to a side penetration test apparatus for battery cells and a battery cell penetration test method using the same. More particularly, the present invention relates to a side penetration test apparatus for battery cells configured to perform safety evaluation under severer conditions than a penetration test of boring a bottom of a battery cell and a battery cell penetration test method using the same.

BACKGROUND

A secondary battery, which is capable of being charged and discharged, has been used as an energy source for mobile devices. In recent years, the secondary battery has also been used as an energy source for devices that require large capacity and high output, such as an electric vehicle.

In order to manufacture such as large-capacity, high-output secondary battery, the size of a battery pack is also increased. Provision of a fire protection structure to a secondary battery is important in securing safety of the secondary battery due to the characteristics of the secondary battery, fire of which is not extinguished until the secondary battery is completely combusted when fire breaks out in the secondary battery.

For example, when external impact is applied to the secondary battery or a sharp electrically conductive member penetrates a case of the secondary battery, electrode plates having different polarities constituting an electrode assembly may be electrically connected to each other via the electrically conductive member, whereby a short circuit may be formed. When great short-circuit current flows between the electrode plates as the result thereof, the temperature of the electrode plates increases, and therefore the temperature of an electrolyte increases. The high-temperature electrolyte is rapidly decomposed and generates a large amount of gas. Since decomposition of the electrolyte is an exothermic reaction, the temperature of the secondary battery locally abruptly increases around the penetrated point, which may eventually cause fire outbreak and thermal runaway of the secondary battery.

In a development stage before commercialization of the secondary battery, therefore, a battery cell penetration test is performed to verify safety of the secondary battery when the secondary battery is penetrated.

In general, the battery cell penetration test is performed using a method of penetrating the secondary using a needle-shaped conductor to intentionally induce short circuit in the secondary battery, measuring a change in temperature or voltage of the secondary battery and checking whether fire breaks out in the secondary battery with the naked eye.

Figure 1:
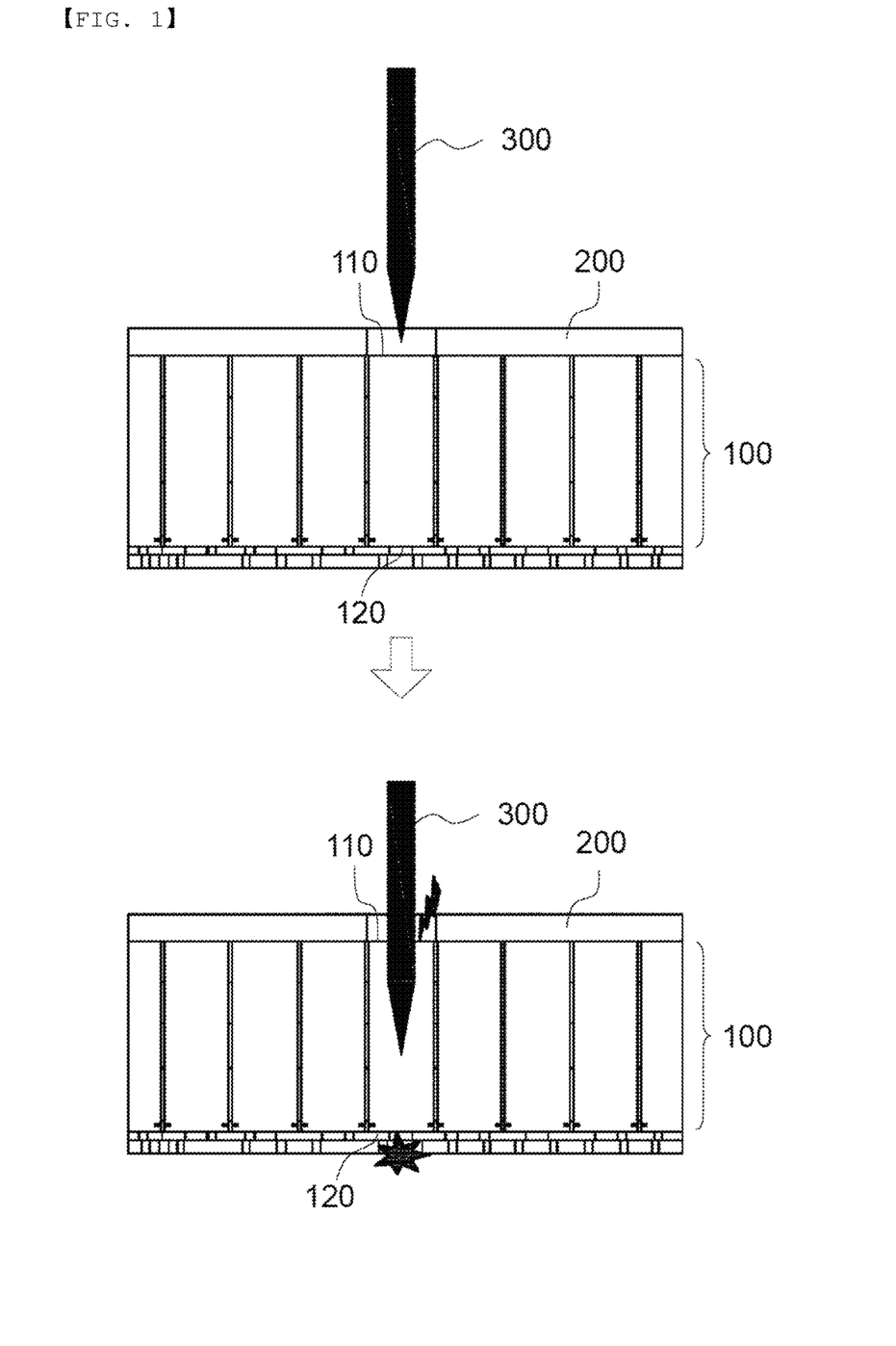
FIG. 1 is a partial vertical sectional view of a battery module showing a conventional battery cell penetration test.

In connection therewith, FIG. 1 is a partial vertical sectional view of a battery module showing a conventional battery cell penetration test.

Referring to FIG. 1, a plurality of cylindrical battery cells 100 is mounted in a module case 200 in a state of being disposed so as to be brought into tight contact with each other. The cylindrical battery cell has a structure in which venting occurs in a direction toward a cap assembly, and the cylindrical battery cell penetration test is performed using a method of boring a bottom 110 of one of the battery cells using a penetration test apparatus.

When the penetration test apparatus bores the bottom 110 of the battery cell, as described above, flames are sprayed to an upper part 120 of the battery cell. As a result, transfer of the flames to battery cells adjacent to the bored battery cell or chain ignition of the battery cells is difficult.

Meanwhile, it is necessary to perform the battery cell penetration test under severer conditions in order to further raise safety standards of the secondary battery. For example, when a side of a cylindrical battery cell is bored, explosive power may also be transmitted to a battery cell adjacent to the bored battery cell.

When the penetration test apparatus shown in FIG. 1 is used, it is possible to bore the bottom of the cylindrical battery cell or to bore the side of the cylindrical battery cell in the state in which a battery module is not assembled; however, it is difficult to bore the side of the cylindrical battery cell in the state in which the battery module is assembled.

Patent Document 1, which relates to a nail for secondary battery penetration testing and a secondary battery penetration test apparatus using the same, discloses a method of disposing a pouch-shaped battery cell on a holding table and moving the nail in a direction perpendicular to a rectangular plane of the pouch-shaped battery cell so as to be forcibly inserted into a secondary battery. That is, Patent Document 1 also does not disclose a penetration test apparatus capable of penetrating a side of a cylindrical battery cell in the state in which battery cells are assembled into a battery module.

Therefore, there is a need to develop a penetration test apparatus capable of performing a battery cell penetration test under severe conditions in order to manufacture a secondary battery with further improved safety and penetrating a side of a cylindrical battery cell in the state in which a battery module is assembled.

PRIOR ART DOCUMENT (Patent Document 1) Korean Registered Patent Publication No. 1764299 (2017 Jul. 27)

DISCLOSURE

Technical Problem

The present invention has been made in view of the above problems, and it is an object of the present invention to provide a side penetration test apparatus for battery cells capable of checking whether, at the time of evaluating safety of battery cells constituting a battery module, flames are transferred to adjacent battery cells, whereby chain ignition occurs, and a battery cell penetration test method using the same.

Technical Solution

A penetration test apparatus according to the present invention to accomplish the above object includes a penetration unit having a needle-shaped conductor formed in the shape of a sharp needle, a guide unit configured to push out the penetration unit such that the needle-shaped conductor bores a side of a battery cell, and a holder configured to receive the penetration unit therein, wherein, when the guide unit pushes the penetration unit, the needle-shaped conductor of the penetration unit penetrates the side of the battery cell.

The guide unit may push the penetration unit while moving into the holder.

A horizontal bar having a length equal to the inner diameter of the holder may be located in the holder, and when the guide unit pushes the penetration unit, the penetration unit may turn about the horizontal bar as the axis of rotation.

The holder may be provided with an opening, when the penetration unit is pushed by the guide unit, the needle-shaped conductor of the penetration unit may pass through the opening, and an outer tip of the needle-shaped conductor that has passed through the opening may protrude from a surface of the holder.

The guide unit may include a front portion and a rear portion extending downwards, a space may be formed between the front portion and the rear portion, and the penetration unit may be inserted into the space in the state in which the guide unit moves into the holder.

The holder may be configured to have a cylindrical structure, and each of an outer surface of the front portion of the guide unit and an outer surface of the rear portion of the guide unit may be configured to have a curved surface corresponding to a cylindrical inner surface of the holder.

The penetration unit may include a first surface, into which the needle-shaped conductor is stuck, and the first surface may be formed as a plane cut in an oblique direction with respect to an imaginary central axis of the penetration unit.

An upper part of the penetration unit may be brought into tight contact with an inner surface of the space in a thickness direction.

An inner surface of the rear portion may be configured to have a flat shape, and an outer surface of the penetration unit opposite a first surface thereof may include a flat portion brought into tight contact with the inner surface of the rear portion in parallel therewith when the guide unit moves into the holder.

The present invention provides a battery cell penetration test method using the penetration test apparatus. Specifically, the battery cell penetration test method may include preparing a battery cell stack including a plurality of battery cells, removing one of the battery cells constituting the battery cell stack and inserting the penetration test apparatus into the position from which the battery cell has been removed, inserting the guide unit of the penetration test apparatus into the holder, and the needle-shaped conductor of the penetration unit penetrating a side of one of the battery cells as the result of being pushed by the guide unit.

Each of the battery cells may include a cylindrical battery cell, a pouch-shaped battery cell, or a prismatic battery cell.

The tip of the needle-shaped conductor of the penetration test apparatus may be disposed so as to face the side of one of the battery cells.

In addition, the present invention may provide various combinations of the above solving means.

Advantageous Effects

As is apparent from the above description, a side penetration test apparatus for battery cells according to the present invention is capable of boring a side of a battery cell in the state in which battery cells are mounted in a battery module case.

Consequently, it is possible to check whether, when any one of the plurality of battery cells arranged in tight contact with each other is bored, explosive power of the bored battery cell is transferred to battery cells adjacent thereto, whereby chain ignition occurs.

A penetration safety test may be performed under severer conditions than a conventional battery cell penetration test, as described above, whereby it is possible to provide a battery cell with improved safety.

In addition, it is possible to perform additional safety verification on side penetration for a battery cell with verified safety on penetration into a bottom of the battery cell.

MODES OF PRACTICE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise. In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

Figure 2:
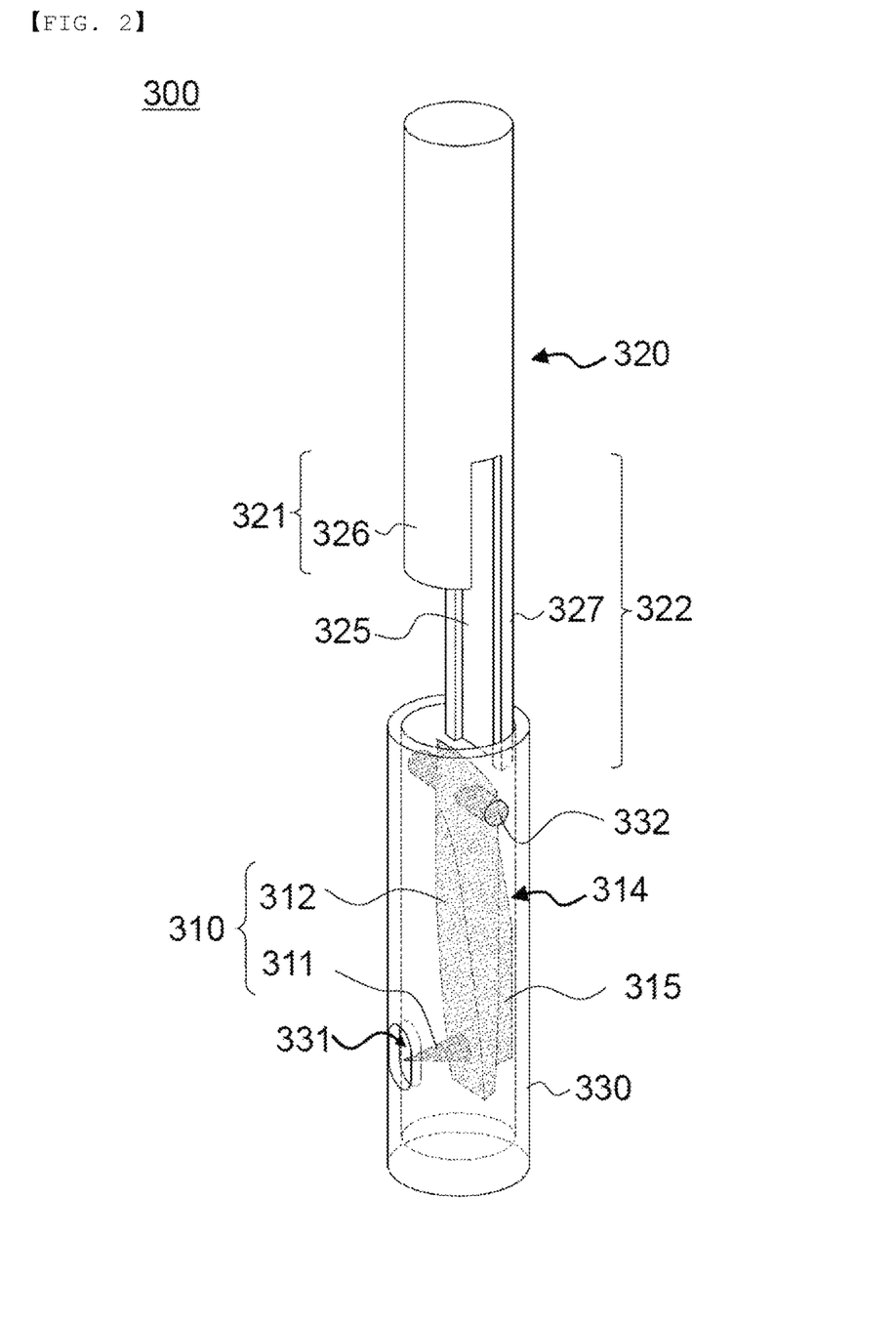
FIG. 2 is a perspective view of a battery cell penetration test apparatus according to the present invention.

FIG. 2 is a perspective view of a battery cell penetration test apparatus according to the present invention.

Referring to FIG. 2, the battery cell penetration test apparatus 300 according to the present invention includes a penetration unit 310 having a needle-shaped conductor 311 formed in the shape of a sharp needle, a guide unit 320 configured to push out the penetration unit 310 such that the needle-shaped conductor 311 bores a side of a battery cell, and a holder 330 configured to receive the penetration unit 310 therein.

The guide unit 320 may be located outside the holder 330, or at least a part of the guide unit may be inserted into the holder 330. When the guide unit 320 moves downwards, the guide unit pushes the penetration unit 310 in a direction toward the battery cell while moving into the holder 330, whereby the needle-shaped conductor 311 of the penetration unit 310 penetrates the side of the battery cell, and therefore internal short circuit of the battery cell may be artificially induced.

A horizontal bar 332 having a length equal to the inner diameter of the holder 330 is located in the holder, and the horizontal bar 332 is disposed so as to extend through an upper part of the penetration unit 310. When the guide unit 320 pushes the penetration unit 310 from the rear thereof, therefore, the penetration unit 310 may turn forwards about the horizontal bar 332 as the axis of rotation.

In the penetration test apparatus 300 shown in FIG. 2, the holder 330 is configured to have a cylindrical structure, and the guide unit 320 includes a front portion 321 and a rear portion 322 extending downwards. In order to achieve an effect in which the penetration unit 310 is pushed as the front portion 321 and the rear portion 322 are inserted into the holder 330 along an inner surface of the holder 330, each of an outer surface 326 of the front portion 321 of the guide unit 320 and an outer surface 327 of the rear portion 322 of the guide unit is configured to have a curved surface corresponding to the cylindrical inner surface of the holder 330.

The holder having the cylindrical structure has an external appearance similar to the external appearance of a cylindrical battery cell such that, in the state in which a plurality of cylindrical battery cells is mounted in a battery module, any one of the cylindrical battery cells is removed and the penetration test apparatus is inserted into the position from which the cylindrical battery cell has been removed in order to perform a penetration test.

Battery cells to which the battery cell penetration test apparatus according to the present invention is applicable may include a cylindrical battery cell, a pouch-shaped battery cell, and a prismatic battery cell. When a battery cell on which a penetration test is to be performed is a prismatic battery cell or a pouch-shaped battery cell, therefore, the shape of the holder may be changed so as to be similar to the external appearance of the prismatic battery cell or the external appearance of the pouch-shaped battery cell. Alternatively, in the penetration test apparatus shown in FIG. 2, the outer diameter of the holder may be formed so as to correspond to the thickness of the prismatic battery cell or the pouch-shaped battery cell.

In a concrete example, a recess 325 is formed in a central part of an inner surface 324 of the rear portion 322, and a protrusion 315 is formed on an outer surface 314 of the penetration unit 310 opposite a first surface 312 thereof. When the guide unit 320 moves into the holder 330, the recess 325 may move downwards while sliding in a state of being coupled to the protrusion 315. Consequently, it is possible to prevent deviation in direction of the guide unit 320 that moves downwards.

Figure 3:
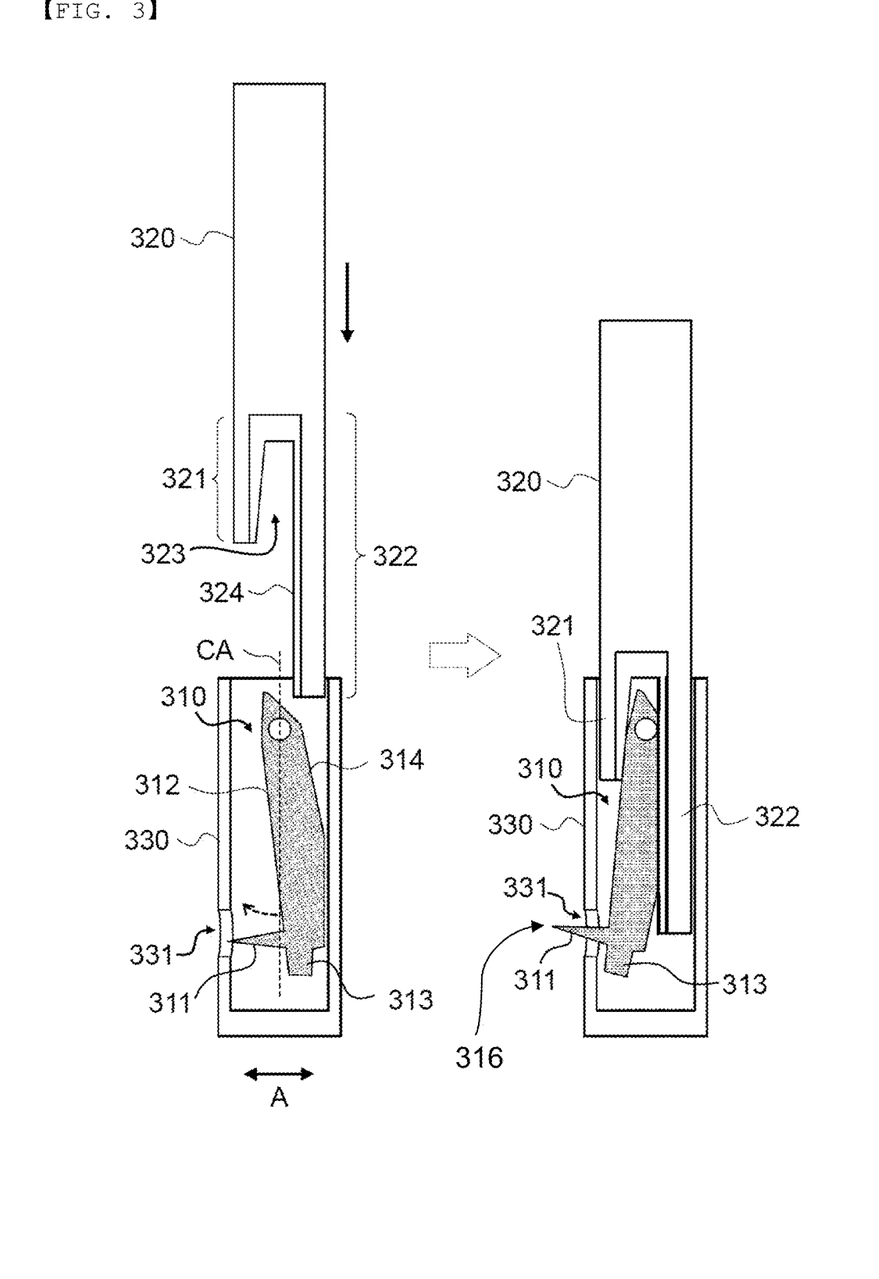
FIG. 3 is a vertical sectional view showing the operation state of the battery cell penetration test apparatus of FIG. 2.

FIG. 3 is a vertical sectional view showing the operation state of the battery cell penetration test apparatus of FIG. 2.

Referring to FIG. 3, the penetration unit 310 includes a first surface 312, into which the needle-shaped conductor 311 is attached (or stuck), and the first surface 312 is formed as a plane cut in an oblique direction with respect to an imaginary central axis CA of the penetration unit 310.

An opening 331 is formed in the side surface of the holder 330 that faces a sharp tip 316 of the needle-shaped conductor 311 of the penetration unit 310. When the guide unit 320 pushes the penetration unit 310, therefore, the penetration unit 310 is turned in a clockwise direction, whereby the needle-shaped conductor 311 of the penetration unit 310 passes through the opening 331.

That is, the entirety of the needle-shaped conductor 311 is located in the holder 330 in the state in which the guide unit 320 does not push the penetration unit 310, and the outer tip 316 of the needle-shaped conductor 311 that has passed through the opening 331 protrudes from a surface of the holder 330 in the state in which the guide unit 320 completely pushes out the penetration unit 310.

At this time, in order to prevent the needle-shaped conductor 311 from excessively protruding to such an extent that the needle-shaped conductor penetrates another battery cell, a catching projection 313 may be added to a lower end of the penetration unit 310.

A space 323 is formed between the front portion 321 and the rear portion 322, and the penetration unit 310 is inserted into the space 323 in the state in which the guide unit 320 moves into the holder 330.

Specifically, an upper part of the penetration unit 310 is brought into tight contact with an inner surface of the space 323 in a thickness direction A. When the guide unit 320 is inserted into the holder 330, an inner surface of the front portion 321 is brought into tight contact with the first surface 312 of the penetration unit 310 in a state of facing the first surface in parallel therewith, and the inner surface 324 of the rear portion 322 is brought into tight contact with the outer surface 314 opposite the first surface in a state of facing the outer surface in parallel therewith.

In a concrete example, the inner surface 324 of the rear portion 322 is configured to have a flat shape, and the outer surface 314 of the penetration unit 310 opposite the first surface 312 includes a flat portion brought into tight contact with the inner surface 324 of the rear portion 322 in parallel therewith when the guide unit 320 moves into the holder 330.

Consequently, the flat portion of the rear portion 322 and the flat portion provided at the outer surface 314 opposite the first surface are brought into tight contact with each other in parallel with each other, whereby the penetration unit 310 is pushed in the clockwise direction.

Figure 4:
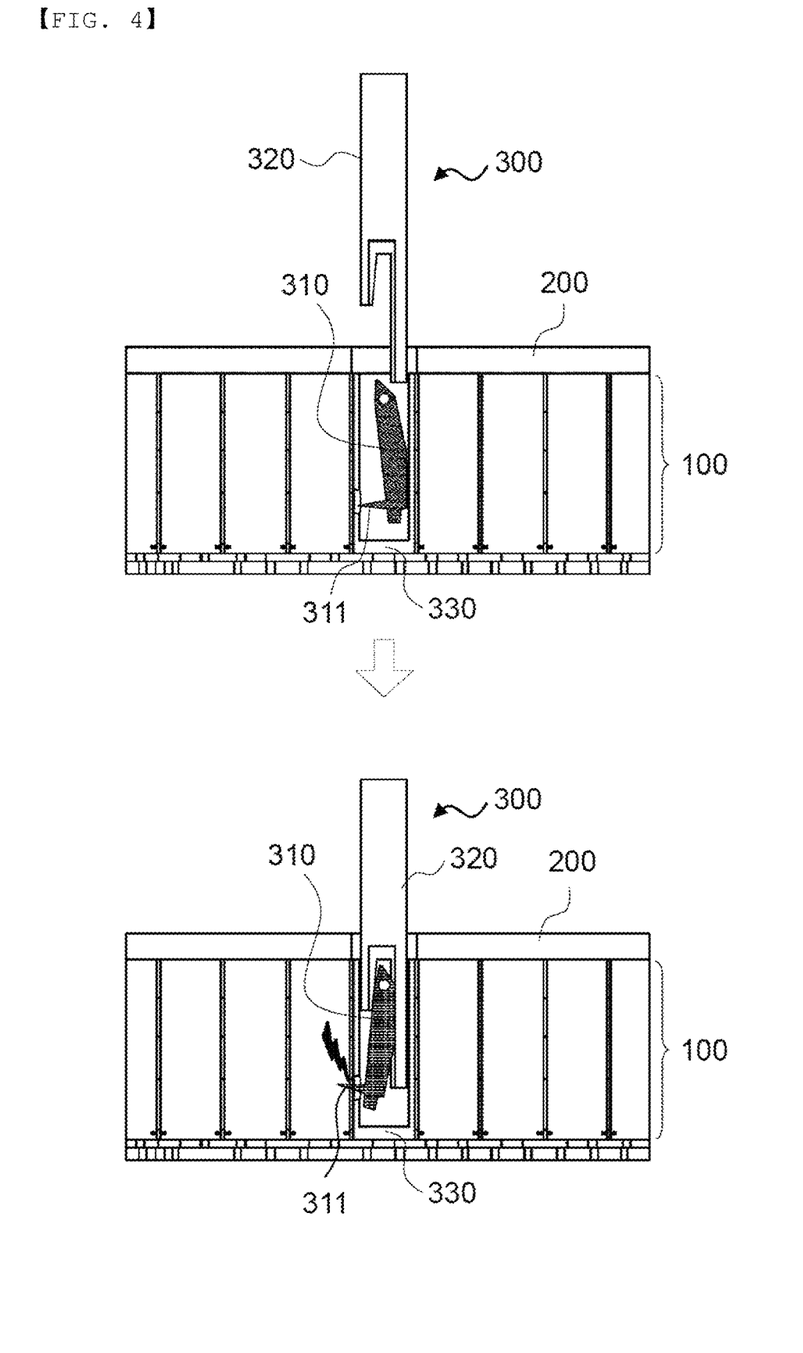
FIG. 4 is a partial vertical sectional view of a battery module showing a battery cell penetration test using the battery cell penetration test apparatus according to the present invention.

FIG. 4 is a partial vertical sectional view of a battery module showing a battery cell penetration test using the battery cell penetration test apparatus according to the present invention.

A battery cell penetration test method according to the present invention includes a step of preparing a battery cell stack including a plurality of battery cells 100, a step of removing one of the battery cells 100 constituting the battery cell stack and inserting the penetration test apparatus 300 into the position from which the battery cell has been removed, a step of inserting the guide unit 320 of the penetration test apparatus 300 into the holder 330, and a step of the needle-shaped conductor 311 of the penetration unit 310 penetrating a side of one of the battery cells 100 as the result of being pushed by the guide unit 320.

Referring to FIG. 4, the battery cell stack including the plurality of battery cells 100 is disposed in a module case 200. Although the battery cells 100 shown in FIG. 4 are cylindrical battery cells, the battery cell penetration test using the penetration test apparatus according to the present invention may also be performed for a battery module including prismatic battery cells or pouch-shaped battery cells instead of the cylindrical battery cells.

The tip 316 of the needle-shaped conductor 311 of the penetration test apparatus 300 is disposed so as to face a side of one of the battery cells 100. When the guide unit 320 pushes out the penetration unit 310, therefore, the needle-shaped conductor 311 bores the side of the battery cell 100.

When the penetration test apparatus according to the present invention is used, as described above, it is possible to bore the side of one of plurality of the battery cells even in the state in which the plurality of battery cells is disposed in the module case, and therefore it is possible to verify whether chain ignition of adjacent battery cells occurs.

When the battery cell penetration test method is performed using the penetration test apparatus according to the present invention, therefore, it is possible to provide battery cells with improved safety.

Those skilled in the art to which the present invention pertains will appreciate that various applications and modifications are possible within the category of the present invention based on the above description.

DESCRIPTION OF REFERENCE NUMERALS

100: Battery cell
110: Bottom of battery cell
120: Upper part of battery cell
200: Module case
300: Penetration test apparatus
310: Penetration unit
311: Needle-shaped conductor
312: First surface
313: Catching projection
314: Outer surface opposite first surface
315: Protrusion
316: Outer tip, sharp tip, or tip
320: Guide unit
321: Front portion
322: Rear portion
323: Space
324: Inner surface
325: Recess
326: Outer surface of front portion
327: Outer surface of rear portion
330: Holder
331: Opening
332: Horizontal bar
CA: Central axis

The invention claimed is:

1. A penetration test apparatus, comprising:
a penetration unit having a needle-shaped conductor formed in a shape of a needle;
a guide unit configured to push out the penetration unit such that the needle-shaped conductor bores a side of a battery cell; and
a holder configured to receive the penetration unit,
wherein the penetration unit comprises a first surface into which the needle-shaped conductor is attached,
wherein before the guide unit pushes the penetration unit, the first surface is at a first angle with respect to an imaginary central axis of the penetration unit,
wherein the imaginary central axis extends in a vertical direction, and
wherein when the guide unit moves in the vertical direction and pushes the penetration unit;
the penetration unit rotates such that the first surface is at a second angle with respect to the imaginary central axis of the penetration unit, and the second angle is different from the first angle; and
the needle-shaped conductor of the penetration unit penetrates the side of the battery cell.

2. The penetration test apparatus according to claim 1, wherein the guide unit is configured to push the penetration unit while moving into the holder.

3. The penetration test apparatus according to claim 2, wherein
the holder is provided with an opening,
when the penetration unit is pushed by the guide unit, the needle-shaped conductor of the penetration unit passes through the opening, and
an outer tip of the needle-shaped conductor that has passed through the opening protrudes from a surface of the holder.

4. The penetration test apparatus according to claim 1, wherein
a horizontal bar having a length equal to an inner diameter of the holder is located in the holder, and
when the guide unit pushes the penetration unit, the penetration unit turns about the horizontal bar as an axis of rotation.

5. The penetration test apparatus according to claim 1, wherein
the guide unit comprises a front portion and a rear portion extending downwards,
a space is formed between the front portion and the rear portion, and
the penetration unit is configured to be inserted into the space in a state in which the guide unit moves into the holder.

6. The penetration test apparatus according to claim 5, wherein
the holder is configured to have a cylindrical structure, and
each of an outer surface of the front portion of the guide unit and an outer surface of the rear portion of the guide unit is configured to have a curved surface corresponding to a cylindrical inner surface of the holder.

7. The penetration test apparatus according to claim 5, wherein an upper part of the penetration unit is brought into contact with an inner surface of the space in a thickness direction.

8. The penetration test apparatus according to claim 5, wherein
an inner surface of the rear portion is configured to have a flat shape, and
an outer surface of the penetration unit opposite the first surface of the penetration unit comprises a flat portion brought into contact with the inner surface of the rear portion in parallel with the flat portion when the guide unit moves into the holder.

9. The penetration test apparatus according to claim 1, wherein
the first surface is formed as a plane cut in an oblique direction with respect to the imaginary central axis of the penetration unit.

10. A battery cell penetration test method using the penetration test apparatus according to claim 1, the battery cell penetration test method comprising:
preparing a battery cell stack comprising a plurality of battery cells;

removing one of the plurality of battery cells constituting the battery cell stack and inserting the penetration test apparatus into a position from which the one of the plurality of battery cells has been removed;

inserting the guide unit of the penetration test apparatus into the holder; and the needle-shaped conductor of the penetration unit penetrating a side of another one of the plurality of battery cells as a result of being pushed by the guide unit.

11. The battery cell penetration test method according to claim 10, wherein each of the plurality of battery cells comprises a cylindrical battery cell, a pouch-shaped battery cell, or a prismatic battery cell.

12. The battery cell penetration test method according to claim 10, wherein a tip of the needle-shaped conductor of the penetration test apparatus is disposed so as to face the side of the another one of the plurality of battery cells.

13. The penetration test apparatus according to claim 1, wherein the imaginary central axis is perpendicular to a bottom surface of the holder.

14. The penetration test apparatus according to claim 1, wherein when the guide unit pushes the penetration unit:

the guide unit moves downward into the holder in a straight path along the vertical direction; and the penetration unit does not move in a straight path along the vertical direction when the penetration unit causes the needle-shaped conductor to penetrate the side of the battery cell.

15. The penetration test apparatus according to claim 1, comprising:

a horizontal bar disposed perpendicular to the imaginary central axis of the penetration unit, wherein when the guide unit pushes the penetration unit, the penetration unit rotates about the horizontal bar that serves as an axis of rotation, and the second angle is different from the first angle in magnitude, in orientation or in both.

16. The penetration test apparatus according to claim 1, wherein when the guide unit pushes the penetration unit:

the guide unit moves downward into the holder in a straight path along the vertical direction; and the needle-shaped conductor does not move downward in a same direction as the guide unit, and does not move in a straight path that is parallel or perpendicular to the imaginary central axis of the penetration unit.

\* \* \* \* \*